United States Patent Office 3,488,730
Patented Jan. 6, 1970

3,488,730
SALTS OF CEPHALOSPORIN ANTIBIOTICS
Verlin C. Stephens, Indianapolis, Ind., assignor to Eli Lilly and Company, Indianapolis, Ind., a corporation of Indiana
No Drawing. Filed Sept. 8, 1966, Ser. No. 577,825
Int. Cl. C07d 99/24; A61k 21/00
U.S. Cl. 260—243
9 Claims This invention relates to antibiotics of the cephalosporin class, and more particularly to certain salts thereof having limited solubility of aqueous fluids, whereby they may be administered from aqueous vehicles to provide a higher antibiotic activity per unit volume in a longer acting form than is obtainable from commercially available water-soluble forms of cephalosporin antibiotics.

Cephalosporin compounds of the formula:

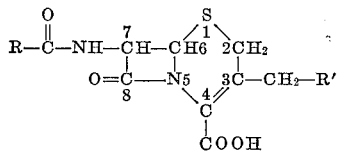

wherein R is selected from the group consisting of 2-thienylmethyl, 2-furylmethyl, phenylmercaptomethyl, benzyl, and the closely related phenyl ring substituted analogs, such as trifluoromethylphenylmercaptomethyl and nitrobenzyl, and the like, and R' is selected from the group consisting of hydrogen and acetoxy are antibiotically active against a wide variety of Gram-positive and Gram-negative organisms. They can be used in their water soluble salt form. For example, sodium cephalothin [sodium 7-(2-thienylacetamido)-cephalosporanate], which is commercially available, is soluble in water to the extent of about 220–250 mg. per milliliter of solution. About 4.5 milliliters of this aqueous solution of cephalothin are needed to administer a one-gram dose.

Aqueous solutions of sodium cephalothin and related water soluble salts are administered parenterally and are almost immediately taken up in the blood and are metabolized, or excreted therefrom in about 6 hours. Thus, it requires about four injected doses of the water-soluble form of the cephalosporin antibiotic to administer the usually recommended daily dose of about 2 to 6 grams of the cephalosporin and maintain blood levels throughout the day.

Those in the pharmaceutical art are, therefore, searching for a drug form of the cephalosporin antibiotics which will have a higher antibiotic lever per unit volume of dose and also which will provide a form of the drug in depot form, i.e., in a form which is only slowly dissolved in the blood so that the number of daily doses can be reduced. The reason and advantage for this is to reduce the pain and inconvenience suffered by the patient while still maintaining a desired level of antibiotic substance in the blood.

However, finding a form of a cephalosporin antibiotic which has both high unit volume antibiotic activity and prolonged staying power, has not been easy because there are several problems involved in obtaining such a product.

There is no direct correlation between salts of penicillin and those of cephalosporin antibiotics with regard to solubility. For example, procaine forms a water insoluble salt of penicillin G, but not with cephalothin.

Aside from the solubility problem is the dosage problem of cephalosporin antibiotics. The recommended dose of sodium cephalothin is usually from 2 to 6 grams per day. A very high cephalosporin antibiotic activity per unit volume is needed if dosage is to be cut down. At the same time the crystalline form of the selected cephalosporin salt must be such that heavy aqueous suspensions thereof will still flow through a needle. Some salts of cephalothin with amines of suitably low equivalent weight have an unfortunate tendency to crystallize in forms which lead to very thick aqueous suspensions even at low concentrations, and thus are rejected for failure to be easily administered, or because they provide too low a concentration of antibiotic activity per unit volume. For example, an aqueous suspension containing 250 mg. per milliliter of dibenzylethylenediamine salt of cephalothin is almost solid.

Still another factor that must be considered is that the blood solubility of the desired salt must be limited to a very narrow range. Thus, for example, a cephalothin salt with a water solubility higher than about 10 milligrams of cephalothin per milliliter of solution is undesirable in that it would be dissolved in the blood too quickly to obtain the desired long-lasting antibiotic effect, while a salt having a water solubility lower than about 1 milligram of cephalothin activity per milliliter would dissolve too slowly to give adequate blood concentrations of the antibiotic.

It is an object of this invention to provide cephalosporin compounds in a salt form which can be suspended in water for parenteral administration in concentrations which provide higher antibiotic activity per unit volume of dose than is obtainable from commercially available water-soluble salts of the same cephalosporin antibiotics.

A further object of this invention is to provide cephalosporin antibiotic compositions which provide almost immediate as well as prolonged blood concentrations of the antibiotic so that the number of needed doses may be reduced.

Other objects, advantages, and aspects of this invention will become apparent from reading the description and the appended claims which follow.

Briefly, this invention provides new, substantially water insoluble, salts of caphalosporin antibiotics, which crystallize in a readily dispersible form to produce elegant pharmaceutical aqueous suspensions, and which when administered parenterally provide a depot form of the cephalosporin antibiotic which dissolves slowly into the blood to give prolonged antibiotic blood levels ranging up to about 24 hours. This invention thus satisfies a need for a cephalosporin drug form which reduces the number of doses per day.

The compounds of this invention may be described generally as bis(cephalosporin) salts of trans-1,3- and trans-1,4-cyclohexanediamine, trans-1,3- and trans-1,4-cyclohexane bis(alkyleneamine) where alkylene denotes 1 to 3 carbon atoms, and 1,3- and 1,4-xylene-alpha, alpha'-diamine. The cephalosporin molecule which forms the desired bis-salts of the invention, preferably has the formula:

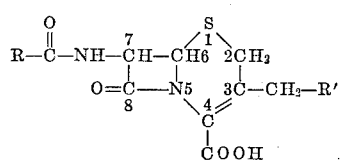

wherein R and R' are as defined above.

Specific examples of the salts of this invention include the trans-1,3- and the trans-1,4-cyclohexanebis(methyleneamine) bis[7-(2-thienylacetamido)cephalosporanate];
trans-1,3- and trans-1,4-cyclohexanebis(methyleneamine) bis[7-(2-furylacetamido)-cephalosporanate];
trans-1,3- and trans-1,4-cyclohexanebis(methyleneamine)

bis[7-(phenylmarcaptoacetamido)cephalosporanate];

trans-1,3- and trans-1,4-cyclohexanebis(ethyleneamine) bis[7-(o-trifluoromethylphenylmarcaptoacetamido) cephalosporanate];

trans-1,3- and trans-1,4-cyclohexanebis(propyleneamine) bis 7-(p-nitrophenylacetamido)cephalosporanate];

trans-1,3- and trans-1,4-cyclohexanediamine bis[7-(2-thienylacetamido)cephalosporanate];

trans-1,3- and trans-1,4-cyclohexanediamine bis[7-(phenylmercaptoacetamido)cephalosporanate];

trans-1,3- and trans-1,4-cyclohexanediamine bis[7-(p-trifluoromethylphenylmarcaptoacetamido)cephalosporanate];

1,3- and 1,4-xylene-alpha,alpha'-diaminebis[7-(m-nitrophenylametamido)cephalosporanate];

1,3- and 1,4-xylene-alpha,alpha'-diaminebis[7-(2-furylacetamido)desacetoxycephalosporanate];

1,3- and 1,4-xylene-alpha,alpha'-diaminebis[7-(2-thienylacetamido)desacetoxycephalosporanate];

trans-1,3- and trans-1,4-cyclohexanebis(methyleneamine) bis[7-(2-thienylacetamido)desacetoxycephalosporanate trans-1,3- and trans-1,4-cyclohexanebis(ethyleneamine) bis[7-(phenylmercaptoacetamido)desacetoxycephalosporanate];

trans-1,3- and trans-1,4-cyclohexanebis(propyleneamine) bis[7-(p-trifluoromethylphenylmarcaptoacetamido) desacetoxycephalosporanate];

trans-1,3- and trans-1,4-cyclohexanebis(methyleneamine) bis[7-(2-furylacetamido)desacetoxycephalosporanate];

trans-1,3- and trans-1,4-cyclohexanediamine bis[7-(2-thienylacetamido)-desacetoxycephalosporanate];

trans-1,3- and trans-1,4-cyclohexanediamine bis[7-(phenylmercaptoacetamido)desacetoxycephalosporanate; and trans-1,3- and trans-1,4-cyclohexanediamine bis[7-(m-trifluoromethylphenylmarcaptoacetamido)desacetoxycephalosporanate].

The desired diamine cephalosporanic acid derivative salts can be prepared by conventional amine salt-forming procedures. A suitable procedure is to commingle an aqueous solution of a water-soluble salt form of the selected diamine with an aqueous solution of the selected cephalosporin antibiotic as a water-soluble salt. I prefer to mix the solutions by simultaneously adding and stirring or agitating the amine salt and cephalosporanic acid salt solutions in a suitable vessel. When a water-soluble trans-1,3- or a trans-1,4-cyclohexanebis(alkyleneamine) salt is being used to prepare the substantially water insoluble salts of this invention, it is preferred to separate the trans-1,3- or trans - 1,4 - cyclohexanebis(alkyleneamine) from the cis isomers by known methods before mixing the trans-isomer with the cephalosporin material to avoid later separation problems or the dilution effect of having the cis-isomer salt present, but such separation is not essential, sinc the cis isomers form salts which are water soluble.

The preferred cycloaliphatic diamine salts of cephalosporin antibiotics prepared as described above precipitate from aqueous media in a substantially spherical crystal form rather than as needle crystals, which is common for other salts. The spherical crystals are quite dense and form excellent water suspensions when milled to the appropriate particle size below about 100 microns. These salts can be administered in water suspension or in other common pharmaceutically acceptable suspension media, e.g., in a lacithin-sodium citrate-water mixture.

The substantially water insoluble salts of the cephalosporin antibiotics of this invention may be used alone to combat a broad range of microorganisms, including both Gram-positive and Gram-negative pathogens. They are compatible with and can be used in conjunction with water-soluble salts of the same cephalosporin molecules. An example is to administer parenterally a mixture of about 20 percent by weight of the water-soluble sodium 7-(2-thienyl)acetamidocephalosporanate with 80 percent by weight of the trans-1,4-cyclohexanebis(methyleneamine) bis-7-(2-thienyl)-acetamidocephalosporanate salt in a water medium to obtain both a high initial cephalosporin activity blood level from the water-soluble salt of the antibiotic and a prolonged cephalosporin activity from the water-insoluble salt.

The invention will be more readily understood from the following operating examples, which are submitted as illustrations only and not by way of limitation.

EXAMPLE 1

A solution of 28.5 g. (0.13 mole) of trans-1,4-cyclohexanebis(methyleneamine) dihydrochloride in 200 cc. of water and a solution of 105 g. (0.25 mole) of sodium cephalothin [the sodium salt of 7(2-thienylacetamido) cephalosporanic acid] in 500 cubic centimeters of water are combined by adding them dropwise to a well-stirred suspension of about 1 g. of the desired trans-1,4-cyclohexanebis(methyleneamine) bis-cephalothin salt in 200 cc. of water. The bis-amine salt product thus obtained forms as large, dense, water-insoluble particles which are nearly spherical in shape. The yield of the bis-amine salt is about 95 g. (85% of theory).

Because of the unique crystal form of the trans-1,4-cyclohexanebis(methyleneamine) bis(cephalothin) salt, an aqueous suspension therefrom, containing 60% solids in still fluid enough to be injected through a small needle (No. 20–24), after grinding the solid to appropriate particle size.

By combining the water-insoluble trans-1,4-cyclohexanebis(methyleneamine) bis(cephalothin) salt with water-soluble sodium cephalothin, one can obtain up to about 625 mg. of cephalothin activity per cubic centimeter of liquid volume. The maximum concentration of cephalothin activity in a solution of the sodium salt form alone is approximately 220–250 mg. per cubic centimeter of liquid volume.

EXAMPLE 2

The procedure of Example 1 is repeated except that an equivalent amount of 1,3-xylene-alpha, alpha'-diamine dihydrochloride is substituted for the trans-1,4-cyclohexanebis(methyleneamine) dihydrochloride salt to form the substantially water insoluble 1,3-xylene-alpha, alpha'-diamine bis(cephalothin) salt.

EXAMPLE 3

The procedure of Example 1 is repeated except that an equivalent amount of 1,4-xylene-alpha, alpha'-diamine dihydrochloride is substituted for the trans-1,4-cyclohexanebis(methyleneamine) dihydrochloride salt to form the water insoluble 1,4-xylene-alpha, alpha'-diamine bis(cephalothin) salt.

EXAMPLE 4

The trans-1,4-cyclohexanebis(methyleneamine) bis[7-(phenylmercaptoacetamido)desacetoxy cephaloporanate] salt was prepared by commingling an aqueous solution of the potassium salt of 7-(phenylmercaptoacetamido)desacetoxy cephalosporanic acid with an aqueous solution of trans - 1,4 - cyclohexanebis(methyleneamine) dihydrochloride at room temperature and collecting the precipitate which resulted.

EXAMPLE 5

The trans-1,4-cyclohexanebis(methyleneamine) bis[7-(o - trifluoromethylphenylmercaptoacetamido) cephalosporanate] salt was prepared by commingling an aqueous solution of potassium 7-(o-trifluoromethylphenylmercaptoacetamido)cephalosporanate with an aqueous solution of trans-1,4 - cyclohexanebis(methyleneamine) dihydrochloride and collecting the precipitate which resulted.

EXAMPLE 6

The trans-1,4-cyclohexanebis(methyleneamine) bis[7-(p - nitrophenylacetamido)desacetoxy cephalosporanate]

salt was prepared by commingling an aqueous solution of potassium 7-(p-nitrophenylacetamido)desacetoxycephalosporanate with an aqueous solution of trans-1,4-cyclohexanebis(methyleneamine) dihydrochloride and collecting the precipitate which resulted. The 7-(p-nitrophenylacetamido) desacetoxycephalo sporanic acid is not my invention. Only this specific salt is subject of this invention.

EXAMPLE 7

The trans-1,4-cyclohexanebis(methyleneamine) bis[7-(2-furylacetamideo)cephalosporanate] salt was prepared by commingling an aqueous solution of potassium 7-(2-furylacetamido)cephalosporanate with an aqueous solution of trans-1,4-cyclohexanebis(methyleneamine) dihydrochloride at room temperature and collecting the precipitate which resulted.

EXAMPLE 8

This example illustrates the usefulness of the water-insoluble salts of cephalosporanic acid antibiotic salts of this invention as a means for maintaining cephalothin-type antibiotic activity in the blood for prolonged periods of time, as compared with a commercially available water soluble salt of the same cephalothin.

In this test, dogs were injected with single doses of (a) the sodium salt of cephalothin in aqueous solution equivalent to 10 milligrams per kilogram of body weight, or (b) the trans-1,4-cyclohexanebis(methyleneamine) bis(cephalothin) salt in aqueous suspension in an amount equivalent to 10 milligrams per kilogram of body weight.

Thereafter, blood samples were taken from the dogs at time intervals of one-half hour, 1 hour, 2 hours, 4 hours, 6 hours [in case of compound (a)], 7 hours [in case of compound (b)], and 24 hours. The blood sample serums were analyzed for cephalothin content by the method referred to in an article by J. S. Welles et al., in "Antimicrobial Agents and Chemotherapy—1965," pp. 863–69. The results are summarized in the following table.

TABLE 1

|  | Blood Serum Contents (in micrograms/ml.) | |
| --- | --- | --- |
|  | Compound (a) | Compound (b) |
| Time after injection (hours): |  |  |
| 0.5 | 13.0 | 1.41 |
| 1 | 7.2 | 1.72 |
| 2 | 2.2 | 1.47 |
| 4 | 0.36 | 1.16 |
| 6 | 0.13 |  |
| 7 |  | 1.31 |
| 24 | <0.25 | <0.25 |

EXAMPLE 9

This example illustrates the improved and prolonged cephalothin blood level concentration obtained by administering a combination of one of the water insoluble salts of cephalothin of this invention in combination with a water soluble salt of cephalothin.

For this example, two groups of dogs were given intramuscular injection of (a) an aqueous mixture of 10 mg. of the trans-1,4-cyclohexanebis(methyleneamine bis(cephalothin) salt and 2.5 mg./kg. of the sodium salt of cephalothin per kilogram of body weight, or (b) 20 mg./kg. of the trans-1,4-cyclohexanebis(methyleneamine) bis(cephalothin) salt in aqueous suspension, and 5 mg./kg. of the sodium salt of cephalothin in aqueous solution.

Blood samples were taken from the dogs at intervals of one-half hour, one hour, 2 hours, 4 hours, 7 hours, and 24 hours after injection. The blood sample serums were analyzed for cephalothin content as in Example 4. The results are summarized in the following table.

TABLE 2

|  | Dosage, mg./kg. | Blood Level Concentration (microg./ml.) |
| --- | --- | --- |
| Time After Injection (hours): |  |  |
| 0.5 | 10 plus 2.5 | 6.47 |
| 1 | do | 4.27 |
| 2 | do | 1.96 |
| 4 | do | 2.18 |
| 7 | do | 2.11 |
| 24 | do | 0.2 |
| 0.5 | 20 plus 5 | 15.43 |
| 1 | do | 8.67 |
| 2 | do | 4.5 |
| 4 | do | 5.7 |
| 7 | do | 3.41 |
| 24 | do | 0.3 |

EXAMPLE 10

This example illustrates the reduced loss of cephalothin activity through urinary excretion by administration of the water insoluble salts of cephalothin of this invention as compared with losses incurred by administrating a water soluble salt of cephalothin.

For this test dogs were given intramuscular injections of:

(a) The sodium salt of cephalothin in aqueous solution in doses equivalent to 10 mg. of cephalothin activity per kilogram of body weight;

(b) The trans-1,4 - cyclohexanebis(methyleneamine) bis(cephalothin) salt in aqueous suspension in doses equivalent to 10 mg. of cephalothin activity per kilogram of body weight;

(c) The trans - 1,4 - cyclohexanebis(methyleneamine) bis(cephalothin) salt in aqueous suspension in doses equivalent to 10 milligram per kilogram of body weight, plus the sodium salt of cephalothin in aqueous solution in doses equivalent to 2.5 mg./kg. of body weight; or (d) The trans - 1,4 - cyclohexanebis(methyleneamine) bis(cephalothin) salt in aqueous suspension in doses equivalent to 20 mg./kg., plus the sodium salt of cephalothin in aqueous solution in doses equivalent to 5 mg./kg. of body weight.

The urine from the treated dogs was collected for the intervals noted below and analyzed for cephalothin content by the method referred to by J. S. Welles et al., supra, in "Antimicrobial Agents and Chemotherapy—1965" an annular publication of the American Society for Microbiology, pp. 863–69, and C. C. Lee et al., in the same publication, 1961, pp. 155–567. The results are summarized in the following table.

TABLE 3

|  | Time Interval (hours) | Percent of Urinary Recovery of Administered Dose |
| --- | --- | --- |
| Cephalothin Form Tested: |  |  |
| (a) | 0–6 | 69 |
| (b) | 0–2 | 4.5 |
|  | 2–6 | 8 |
|  | 6–24 | 16 |
| (c) | 0–2 | 14.5 |
|  | 2–6 | 10 |
|  | 6–24 | 18 |
| (d) | 0–2 | 18 |
|  | 2–6 | 12 |
|  | 6–24 | 18 |

EXAMPLE 11

The advantages of having the desired cephalosporin antibiotic in a spherical crystal form is illustrated by the following.

Substantially equal volumes of the three indicated amine salts of 7-(2 - thienyl)acetamidocephalosporanic acid were weighed, and then the determined weights were used to calculate the equivalent weight of free cephalothin activity. The results were as follows:

| Salt | Weight, gm. | Cephalothin Activity | |
|---|---|---|---|
| | | Percent | Grams |
| a) Dibenzylamine | 2.5 | 67 | 1.68 |
| b) Dibenzylethylenediamine | 2.8 | 77 | 2.15 |
| c) Trans-1,4-cyclohexanebis-(methyleneamine) | 6 | 85 | 5.1 |

The dibenzylamine and the dibenzylethylene diamine salts were white crystalline powders whereas the trans-1,4 - cyclohexanebis(methyleneamine) salt was in a tan-white spherical-shaped particle form, almost granular in appearance.

I claim:
1. Cephalosporin salts of an amine selected from the group consisting of trans-1,3- and trans-1,4-cyclohexanebis(alkyleneamine) in which alkylene has from 1 to 3 carbon atoms, 1,3- and 1,4-xylene-alpha, alpha'-diamine, and trans-1,3- and trans-1,4-cyclohexanediamine and a cephalosporanic acid of the formula:

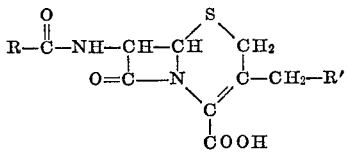

wherein R is selected from the group consisting of thienylmethyl, furylmethyl, phenylmercaptomethyl, benzyl trifluoromethylphenylmercaptomethyl and nitrobenzyl, R' is selected from the group consisting of hydrogen and acetoxy.

2. A cephalosporin salt as described in claim 1 wherein the salt is a trans - 1,4 - cyclohexanebis(alkyleneamine) bis[7 - (2 - thienylacetamido)cephalosporanate] having from 1 to 3 carbon atoms in the alkylene group.

3. A cephalosporin salt as described in claim 1 wherein the salt is trans-1,4-cyclohexanebis(methyleneamine) bis[7-(2-thienylacetamido)cephalosporanate].

4. A cephalosporin salt as described in claim 1 wherein the salt is 1,3-xylene-alpha, alpha'-diamine bis[7-(2-thienylacetamido)cephalosporanate].

5. A cephalosporin salt as described in claim 1 wherein the salt is 1,4-xylene-alpha, alpha'-diamine bis[7-(2-thienylacetamido)cephalosporonate].

6. A cephalosporin salt as described in claim 1 wherein the salt is trans-1,4-cyclohexanebis(methyleneamine) bis[7-(phenylmercaptoacetamido)cephalosporanate].

7. A cephalosporin salt as described in claim 1 wherein the salt is trans-1,4-cyclohexanebis(methyleneamine) bis[7 - (o - trifluoromethylphenylmercaptoacetamido) cephalosporanate].

8. A cephalosporin salt as described in claim 1 wherein the salt is trans-1,4-cyclohexanebis(methyleneamine) bis[7 - (p - nitrophenylacetamido)cephalosporanate].

9. A cephalosporin salt as described in claim 1 wherein the salt is trans - 1,4-cyclohexanebis(methyleneamine) bis[7-(2-furylacetamido)cephalosporanate].

References Cited

UNITED STATES PATENTS

| 3,257,395 | 6/1966 | Griot. |
| 3,218,318 | 11/1965 | Flynn. |
| 3,364,212 | 1/1968 | Patchett. |

NICHOLAS S. RIZZO, Primary Examiner

U.S. Cl. X.R.
424—246

UNITED STATES PATENT OFFICE
CERTIFICATE OF CORRECTION

Patent No. 3,488,730                    January 6, 197

Verlin C. Stephens

It is certified that error appears in the above identified patent and that said Letters Patent are hereby corrected as shown below:

Column 8, line 3, claim reference numeral "1" should read -- 2 --.

Signed and sealed this 23rd day of February 1971.

(SEAL)
Attest:

Edward M. Fletcher, Jr.
Attesting Officer

WILLIAM E. SCHUYLER, JR.
Commissioner of Patents